No. 732,732. Patented July 7, 1903.

UNITED STATES PATENT OFFICE.

WILLIAM D. GILMAN, OF BALTIMORE, MARYLAND.

PROCESS OF MAKING LITHOPHONE AND GLAUBER SALT.

SPECIFICATION forming part of Letters Patent No. 732,732, dated July 7, 1903.

Application filed October 30, 1902. Serial No. 129,468. (No specimens.)

*To all whom it may concern:*

Be it known that I, WILLIAM D. GILMAN, a citizen of the United States of America, residing at Baltimore, in the State of Maryland, have invented certain new and useful Improvements in Processes of Manufacturing Lithophone and Glauber Salt, of which the following is a specification.

In order to give such a description of my improved process that one skilled in the art may practice it, I will proceed to describe the several steps as I have practiced them to a greater or less extent. It is possible that in minor details the process may be modified to some extent, and I do not wish to be understood as limiting the scope of my invention to all of the steps recited herein, my invention, broadly considered, residing in the production of lithophone and Glauber salt as a by-product from niter-cake, zinc, and barium sulfid.

In the manufacture of nitric and sulfuric acids a by-product known as "niter-cake" is obtained. I make a solution of niter-cake of proper strength in water and add to this solution an excess of zinc either in the form of zinc skimmings, spelter, or acid-soluble zinc ore. This solution I digest with steam heat until the acid of the niter-cake is neutralized. It is then allowed to settle and run through another tank, chlorid of lime and milk of lime being added to precipitate the iron, alumina, &c., or this may be accomplished by any other convenient method. The resulting solution is allowed to settle or run through a filter-press into another tank. I now run in a proper proportion of solution of barium sulfid—*i. e.*, just sufficient to precipitate the zinc of the zinc sulfate as zinc sulfid. Lithophone is precipitated and Glauber salt remains in solution. The precipitate is separated and washed by the usual filter-press method. The mother-liquor left after the precipitation of the lithophone is concentrated to a proper crystallizing strength and allowed to crystallize in tanks, Glauber salt being obtained.

The principal reactions are as follows: On digestion of the zinc with the niter-cake solution:

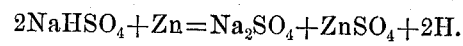
$$2NaHSO_4 + Zn = Na_2SO_4 + ZnSO_4 + 2H.$$

On adding the proper proportion of barium-sulfid solution this reaction occurs:

$$ZnSO_4 (+Na_2SO_4) + BaS = BaSO_4 + ZnS + (Na_2SO_4.)$$

The $BaSO_4$ and the ZnS are precipitated together. This is dried, calcined in furnace, and ground, as in usual method of making lithophone. The $Na_2SO_4$ is allowed to crystallize. The proportions used are approximately as follows: One thousand pounds niter-cake, two hundred and seventy pounds metallic zinc, seven hundred pounds barium sulfid, (BaS.) The quantity of chlorid of lime and milk of lime depends upon the amount of iron, &c., in the niter-cake solution.

The yields obtained in practice are approximately thirteen hundred pounds of lithophone ($BaSO_4 + ZnS$) containing 29.3 per cent. of zinc sulfid and fourteen hundred pounds of crystallized sulfate soda, or, as it is commercially known, "Glauber salt."

In the present state of the art lithophone and Glauber salt are manufactured by independent processes and of materials which themselves are products of other expensive processes; but by my improved process it is seen that I substitute for the comparatively expensive sulfuric acid what has heretofore been considered a waste product in the manufacture of sulfuric or nitric acid and that by the single process I obtain two products. It results that the expense of producing lithophone is materially decreased by the substitution of the niter-cake for the sulfuric acid, and the profit from the practice of the process is greatly increased by the value of the by-product Glauber salt.

I claim as my invention—

1. The herein-described process of manufacturing lithophone and Glauber salt which consists in adding to a solution of niter-cake an excess of zinc and adding a proper proportion of solution of barium sulfate, from which lithophone is precipitated and Glauber salt left in solution.

2. The herein-described process of manufacturing lithophone and Glauber salt which consists in adding an excess of zinc to a solution of niter-cake and digesting with steam until the acid of the niter-cake is neutralized, then adding agents to precipitate the iron, alumina, &c.; next, adding a proper proportion of barium-sulfid solution to precipitate lithophone, and leave the Glauber salt in solution; and finally, concentrating the mother-liquor and allowing the Glauber salt to crystallize.

In testimony whereof I affix my signature in presence of two witnesses.

WILLIAM D. GILMAN.

Witnesses:
  E. H. STRICKLER,
  M. L. THOM.